March 21, 1950 A. KALITINSKY 2,501,056
STARTING FREE-PISTON UNIT
Filed Jan. 28, 1944 2 Sheets-Sheet 1

INVENTOR
Andrew Kalitinsky
Charles A. Warren
ATTORNEY

INVENTOR
Andrew Kalitinsky
Charles Alderson
ATTORNEY

Patented Mar. 21, 1950

2,501,056

UNITED STATES PATENT OFFICE 2,501,056

STARTING FREE-PISTON UNIT

Andrew Kalitinsky, Eagleville, Conn., assignor to United Aircraft Corporation, East Hartford, Conn., a corporation of Delaware Application January 28, 1944, Serial No. 520,055

2 Claims. (Cl. 230—56)

Free-piston units having no crankshaft cannot be started by cranking as in conventional engines, and have been started by using gas under pressure from a tank for moving the pistons. The starting systems are generally of two types.

In one type of starting system the pistons are locked against movement adjacent one end of their strokes, and gas under pressure is admitted to the air springs to develop a predetermined pressure. The locking device is then disengaged and the pistons are moved by the energy of the compressed gas in the air springs to cause the unit to start. The locking device puts a strain on the unit and requires a heavy engaging mechanism because of the pressure developed in the air springs.

The other type of starting system has an accumulator chamber adjoining the air spring in which gas under pressure is collected and from which the gas is discharged into the air spring for moving the piston.

Both systems have used a tank of compressed gas for maintaining a supply of starting gas at the pressure for starting the unit. A feature of this invention is a starting device using a cartridge in preference to a tank as a source of starting energy.

In aircraft installations the tank of high pressure gas for starting is especially undesirable since it causes a substantial increase in the weight of the power plant. Another feature of this invention is the replacement of the tank and the associated starting system by a light weight and dependable starting device.

A feature of the invention is the accurate control of the starting energy since the cartridge which provides the energy may be made to produce a predetermined quantity of energy. Another feature is the minimizing of the necessary starting controls and the simplification of reloading of the starting device.

Other objects and advantages will be apparent from the specification and claims and from the accompanying drawings which illustrate an embodiment of the invention.

Figure 1:
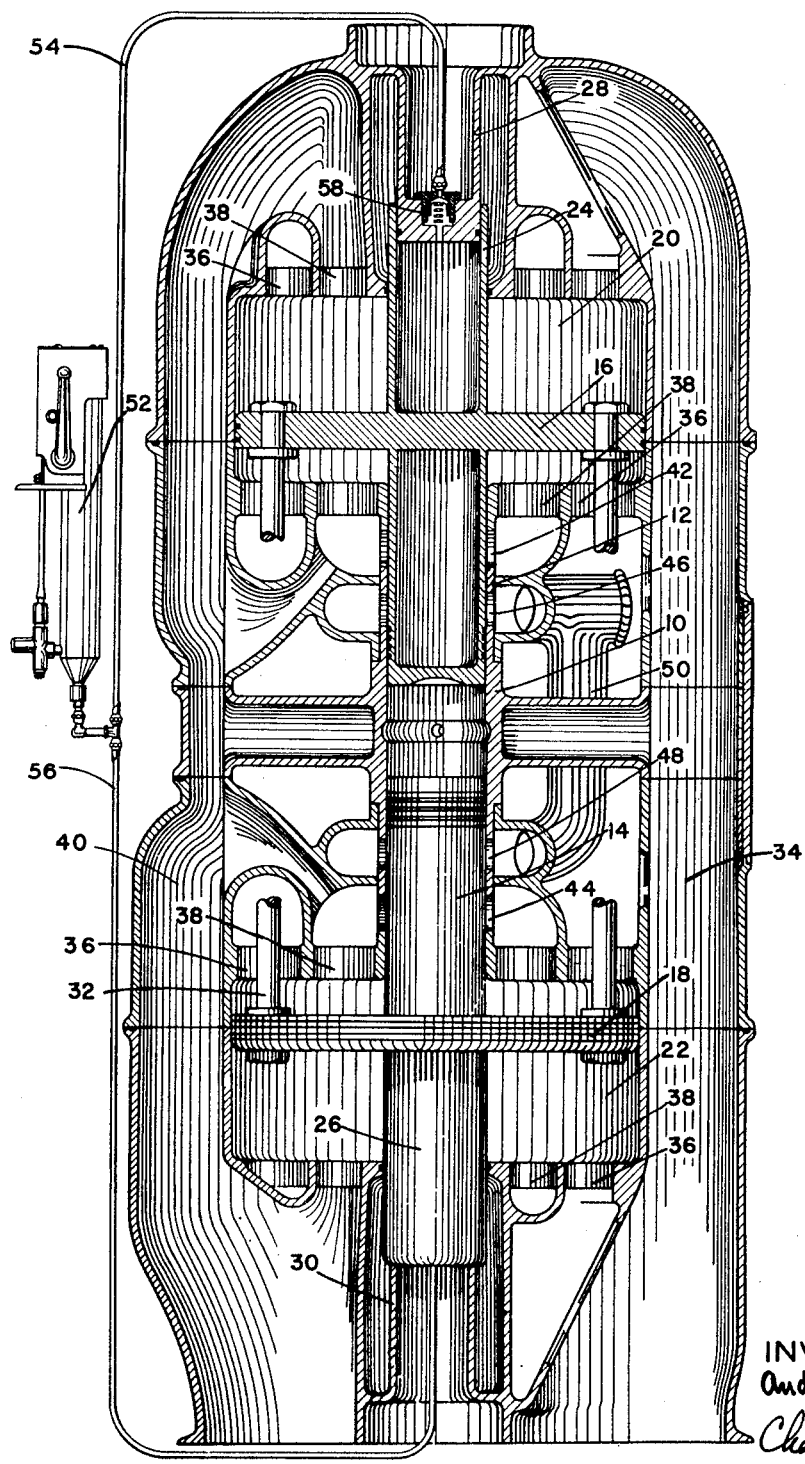
Fig. 1 is a sectional view through the free piston unit with the starting device installed.

The unit shown includes an engine cylinder 10 having reciprocating pistons 12 and 14 to which compressor pistons 16 and 18 in cylinders 20 and 22 are integrally connected. Sleeves 24 and 26 attached to the compressor pistons complete the reciprocating piston assemblies. The sleeves in combination with stationary pistons 28 and 30 form air spring cylinders.

The piston assemblies are moved apart by the burning of fuel injected into engine cylinder 10 by an injection device not shown. Air compressed in the air spring cylinders on the power stroke returns the piston assemblies. The assemblies are always maintained at equal distances from the center of the engine cylinder by a linkage, of which rods 32 extending from the compressor pistons form a part.

Intake manifold 34 conducts air to intake valves 36 through which air alternately enters opposite ends of the compressor cylinders. The compressed air leaves the cylinders through discharge valves 38, also at opposite ends of the compressor cylinders, and passes through scavenge manifold 40, through ports 42 and 44 which are uncovered by pistons 12 and 14 at the end of the power stroke, thereby permitting air to be blown through the engine cylinder and exhaust ports 46 and 48 into exhaust manifold 50.

The unit is started by admitting a predetermined quantity of gas under pressure to the air springs at the ends of pistons 28 and 30, the piston assemblies having previously been moved to a point adjacent the outer ends of their strokes. The pressure in these air springs moves the piston assemblies inwardly, compressing the air within the engine cylinder and causing the unit to start by ignition of the fuel and air mixture in the engine cylinder.

The measured quantity of gas for each air spring is supplied from a cartridge firing device 52, connected by symmetrical conduits 54 and 56 to the ends of pistons 28 and 30 respectively. A check valve 58 may be incorporated in each conduit 54 and 56 to prevent the escape of gas from the air springs after the unit is running. The symmetrical conduits assure equal and simultaneous distribution of starting gas to both air springs.

Figure 2:
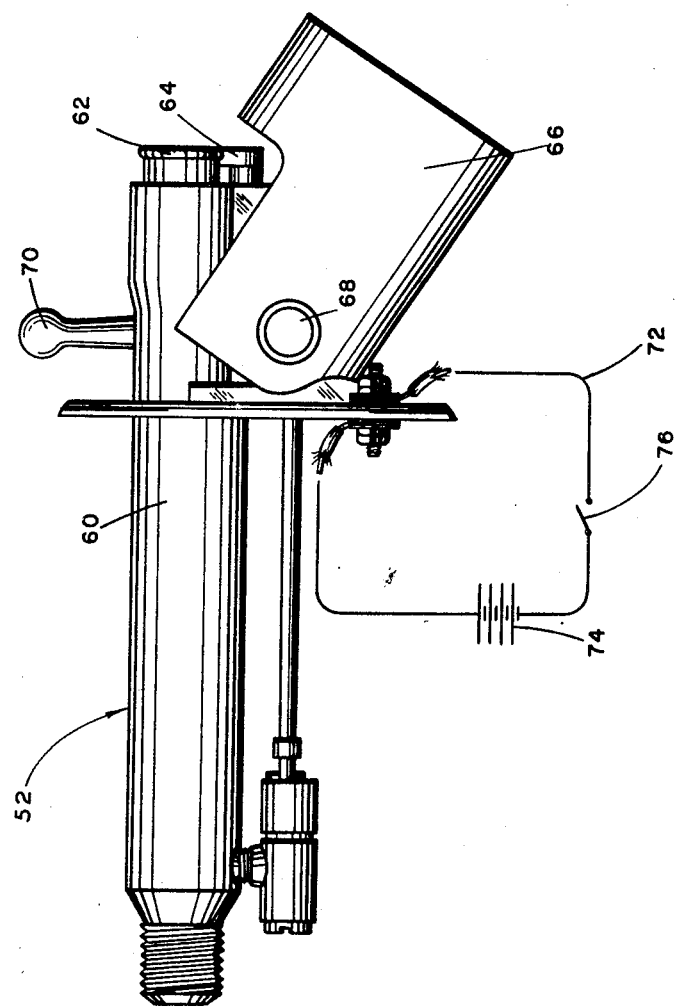
Fig. 2 is a side elevation of the cartridge discharging device.

As shown in more detail in Fig. 2, the cartridge firing device 52 includes a barrel 60, to the end of which the pipes 54 and 56 are connected. The other end of the barrel receives a cartridge 62 which, after being fixed, may be ejected by an extractor 64. The device also includes a breach block 66 pivoted on a locking pin 68 and moved into the cartridge firing position of Fig. 1 by an operating lever 70.

The cartridge may be fired electrically through a circuit 72 which includes a battery or other source of power 74 and a switch 76 by which the circuit may be closed to fire the cartridge. The particular cartridge firing device may be of the type shown in Coffman Patent No. 2,284,640, dated June 2, 1942.

With the arrangement of a starting device of this character there is no necessity for a tank of gas under high pressure, and a measured quantity of gas will be admitted to each air spring each time that the unit is to be started. The cartridges constitute a small and easily handled source of starting energy and it is obvious that the device may readily be reloaded. Each cartridge constitutes a source for a predetermined quantity of gas produced by combustible material in the cartridge, which is ignited when the cartridge is fired.

It is to be understood that the invention is not limited to the specific embodiment herein illustrated and described, but may be used in other ways without departure from its spirit as defined by the following claims.

I claim:

1. In a free-piston engine and compressor unit, an engine including a cylinder and opposed reciprocating pistons, opposed compressors at opposite ends of the engine cylinder, each having a cylinder and piston, each compressor piston being directly connected to the adjacent engine piston, opposed air springs at outer ends of the compressor pistons and acting on the engine pistons, each spring including a cylinder and piston, one of which is connected to the adjacent engine piston, in combination with means for admitting gas to the opposed air springs, said means including a cartridge having combustible material producing a predetermined quantity of gas at a predetermined pressure, means for holding and firing the cartridge, connections from said firing means to said air springs, and check valves in said connections to prevent flow of gas from said air springs to said holding and firing means.

2. In a free-piston engine and compressor unit, an engine including a cylinder and opposed reciprocating pistons, opposed compressors at opposite ends of the engine cylinder, each having a cylinder and piston, each compressor piston being directly connected to the adjacent engine piston, opposed air springs at outer ends of the compressor pistons and acting on the engine pistons, each spring including a cylinder and piston, one of which is connected to the adjacent engine piston, in combination with means for admitting gas to the opposed air springs, said means including a cartridge having combustible material producing a predetermined quantity of gas at a predetermined pressure, means for holding and firing the cartridge, connections from said firing means to said air springs, and check valves in said connections to prevent flow of gas from said air springs to said holding and firing means, said connections from the firing means being symmetrical to assure equal distribution of the gas from the cartridge to the opposite air springs.

ANDREW KALITINSKY.

REFERENCES CITED

The following references are of record in the file of this patent:

UNITED STATES PATENTS

| Number | Name | Date |
| --- | --- | --- |
| 1,903,079 | Woolson | Mar. 28, 1933 |
| 2,005,913 | Coffman | June 25, 1935 |
| 2,164,700 | Coffman | July 4, 1939 |
| 2,178,310 | Pescara | Oct. 31, 1939 |
| 2,189,497 | Pescara | Feb. 6, 1940 |
| 2,222,260 | Janicke | Nov. 19, 1940 |
| 2,284,640 | Coffman | June 2, 1942 |